United States Patent [19]
Dev

[11] Patent Number: 5,253,472
[45] Date of Patent: Oct. 19, 1993

[54] SMALL GAS TURBINE HAVING ENHANCED FUEL ECONOMY

[76] Inventor: Sudarshan P. Dev, 5B Daisy Dr., Seymour, Conn. 06483

[21] Appl. No.: 486,360

[22] Filed: Feb. 28, 1990

[51] Int. Cl.$^5$ .............................................. F02C 3/05
[52] U.S. Cl. ................... 60/39.161; 60/39.43; 60/39.75
[58] Field of Search ............ 60/39.04, 39.161, 39.162, 60/39.37, 39.43, 39.75, 269, 726; 415/199.6, 914; 416/241 B

[56] References Cited

U.S. PATENT DOCUMENTS

| | | | |
|---|---|---|---|
| 2,476,179 | 7/1949 | Cameron | 60/39.37 |
| 2,514,874 | 7/1950 | Kolisman | 60/269 |
| 2,656,096 | 10/1953 | Schwarz | 60/39.37 |
| 2,694,291 | 11/1954 | Rosengert | 60/39.43 |
| 2,709,893 | 6/1955 | Birmann | 60/39.161 |
| 3,010,281 | 11/1961 | Cervanka et al. | 60/726 |
| 3,116,908 | 1/1964 | Wosika | 60/39.161 |
| 3,493,169 | 2/1970 | Abild et al. | 415/199.6 |
| 3,751,907 | 8/1973 | Anderson | 60/39.092 |
| 4,506,502 | 3/1985 | Shapiro | 60/39.43 |
| 4,552,510 | 11/1985 | Takeyuki | 416/241 B |

FOREIGN PATENT DOCUMENTS

| | | | |
|---|---|---|---|
| 899298 | 12/1953 | Fed. Rep. of Germany | 60/39.161 |
| 2511821 | 9/1975 | Fed. Rep. of Germany | 60/39.161 |
| 3339505 | 5/1985 | Fed. Rep. of Germany | 60/39.75 |

*Primary Examiner*—Louis J. Casaregola
*Attorney, Agent, or Firm*—Haynes N. Johnson

[57] ABSTRACT

A gas turbine engine ducted to have the air pass sequentially through a single stage axial-flow compressor, a single-stage hybrid axial-radial centrifugal compressor, a burner, an inward flow radial turbine, an axial-flow, high-pressure turbine, and then exit nozzles. The axial compressor and axial turbine are on a common core shaft. The centrifugal compressor and the radial turbine are on a common porous hub and form an integral, modular unit in which forces on the radial turbine blades drive the centrifugal compressor. The porous common hub permits air to transpire from the compressor to the turbine, serving to cool the turbine. Fuel is burned in annular, "folded-comma" shaped burners with multiple fuel-injection and ignition zones (two-stage combustion).

5 Claims, 5 Drawing Sheets

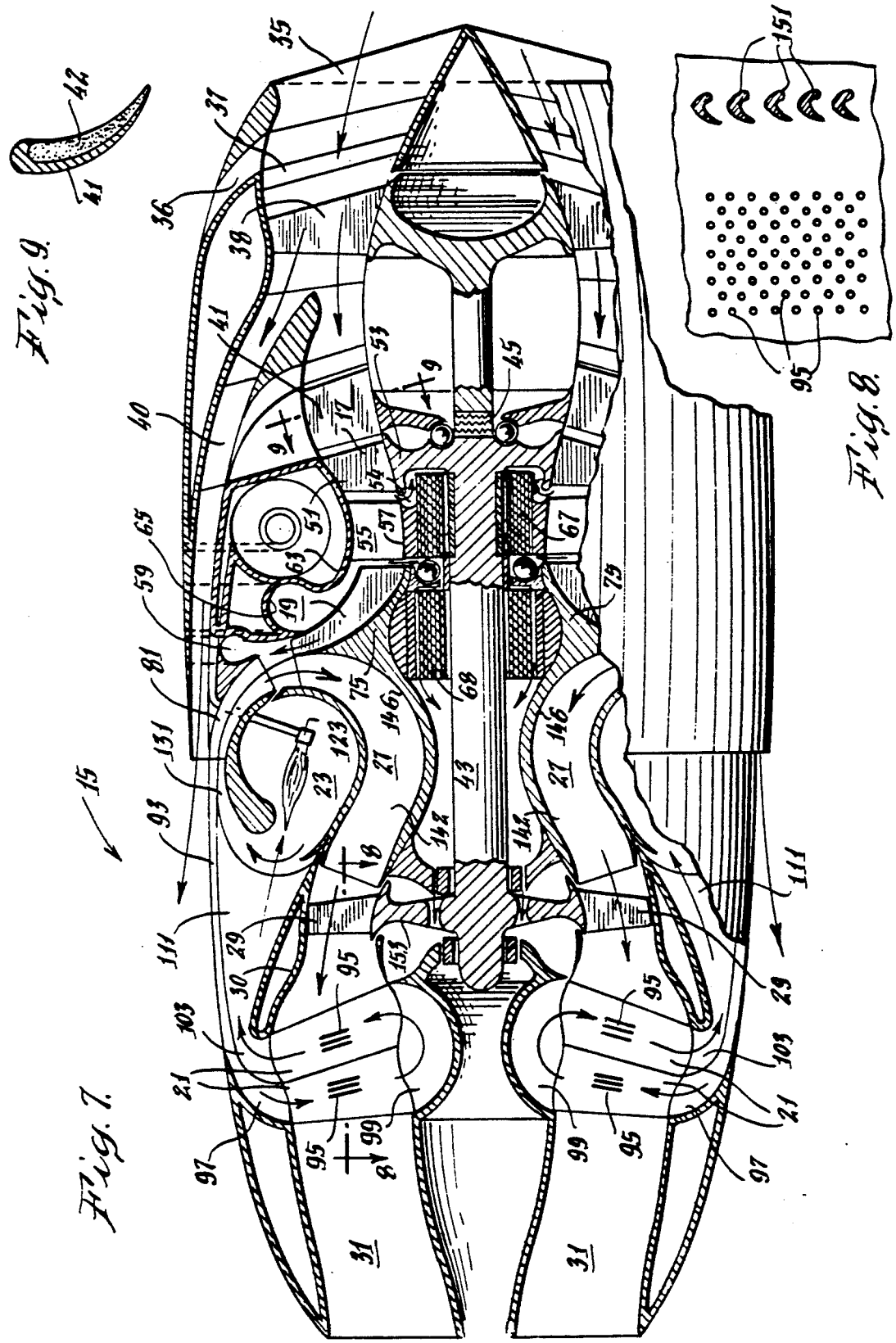

SMALL GAS TURBINE HAVING ENHANCED FUEL ECONOMY

FIELD OF THE INVENTION

My invention relates to the field of gas turbine engines and, in particular, to smaller engines having enhanced fuel economy.

BACKGROUND OF THE INVENTION

In comparison with reciprocating and rotary engines, gas turbine engines offer significant benefits in terms of small size and light weight. In terms of fuel economy, however, gas turbine engines have lagged behind the other engines, particularly for the small engine sizes. Gas turbine engines have also been considerably more expensive, mainly due to intricate designs, close manufacturing tolerances, and the use of exotic materials. Data as to many of these prior art engines are found in "The Aircraft Gas Turbine Engine And Its Operation," United Technologies (Pratt and Whitney), 1988; and "Aircraft Gas Turbine Guide," (General Electric (Aircraft Engine Group), 1980.

My gas turbine engines have a smaller size and lesser weight than current turbine engines having the same power. Consequently, they provide less weight for the same power or more power for the same weight as prior engines. As a result, they offer greater range or flying power and savings in fuel consumption, initial cost, and maintenance.

BRIEF SUMMARY OF THE INVENTION

The basic core structure of my engine is ducted to have the air pass sequentially through a single stage axial-flow compressor, a single-stage hybrid axial-radial centrifugal compressor, a burner, an inward flow radial turbine, an axial-flow, high-pressure turbine, and then exit nozzles. The axial compressor and axial turbine are on a common core shaft. The centrifugal compressor and the radial turbine are not separate units on a shaft, but form an integrated unit with a common face.

The single-stage axial-flow compressor has a reduced setting angle for the blades leading to a higher ratio than normal between the streamwise chord and the axial chord and a high compression tip velocity. This serves to optimize pressure rise and stage efficiency through sacrifice of axial mass flow. The pressure rise is multiplied with the following centrifugal compressor.

The first turbine in the series is a high-reaction inward-radial entry, axial-discharge transonic first stage driving a high-pressure centrifugal compressor; it is followed by an axial-flow high-impulse second stage driving the core shaft which is coupled to the low-pressure axial compressor. The core shaft also provides shaft power to a gear box for power output or drives a variety of devices such as fans, booster compressor, etc.

The combined centrifugal compressor and inwardly radial turbine have a common face and so rotate together. The common face is formed of porous material permitting air seepage from the compressor to the turbine, serving to cool the turbine. The seepage of air serves to remove stalled boundary layer air from the compressor and to cool the radial turbine, thus accomplishing a double function. Having a common face between the compressor and turbine also eliminates windage losses for both components and hence improves their efficiency. This compressor-turbine unit is modular and, so, may be readily replaced as a unit.

Fuel is burned in annular, "folded-comma" shaped burners with multiple fuel-injection and ignition zones (two-stage combustion). The folded comma shape of the burners permits them to fit within and substantially fill the annular spaces radially outward of the turbines, providing for a more compact engine. It also results in the burners being surrounded on all sides by fluid ducts which use the heat; this is more efficient and eliminates the need to cool the engine cowl. The burners feed a set of nozzles for the high-pressure turbine. Due to the curved shape of the burners, infra-red radiation in the exit nozzles is substantially reduced.

The core engine is normally preceded by a grill-set, dust deflector and filter, and is followed by a cross- and counter-flow recuperator to transfer thermal energy from exhaust gases to compressed air flowing to the burners.

A typical core engine of my invention would have a diameter of about 0.35 m., and a length, including inlet ducts, recuperator, and exit nozzle of about 0.75 m. This engine would deliver about 600 kW (800 bhp) of power, with realistic component efficiencies, at about 54,000 rpm of the power shaft. The power may be used at either end, front or rear, of the engine.

My engine may be used for a turbojet engine, low-, medium-, or high-bypass-ratio turbofans, or in a turboshaft configuration. The basic design for the fans is the use of swept blades with long chords and high solidity, avoiding the need for snubbers.

DESCRIPTION OF THE DRAWINGS

FIG. 7 is a perspective view, broken away to provide internal details, partially in longitudinal section, showing my core engine as part of a low-bypass-ratio turbofan; this Figure also shows an inlet grill, debris blocker, and dust collector of a type usable with my core engine;

FIG. 8 is a section, taken on line 8—8 of FIG. 7, showing the axial turbine blades and the recuperator; and FIG. 9 is a section taken on line 9—9 of FIG. 7, showing an inlet guide blade.

DETAILED DESCRIPTION OF THE INVENTION

Figure 1:
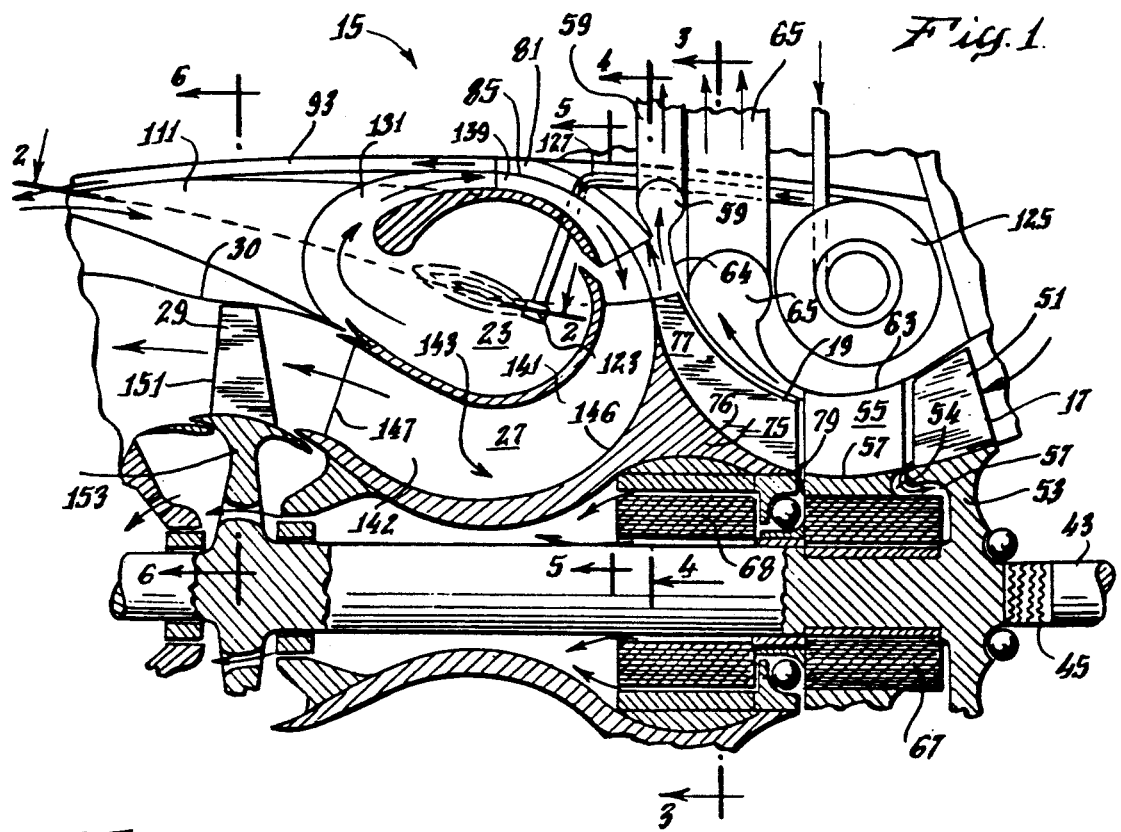
FIG. 1 is a section of the core of my engine taken on a radius thereof.
Figure 2:
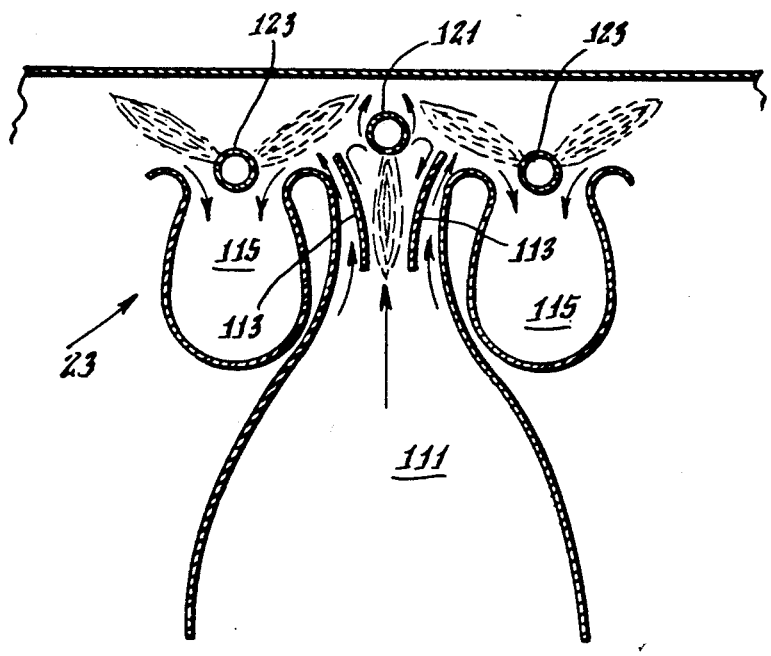
FIG. 2 is a developed transverse section looking in a radial direction, showing my "folded-comma" burners.
Figure 3:
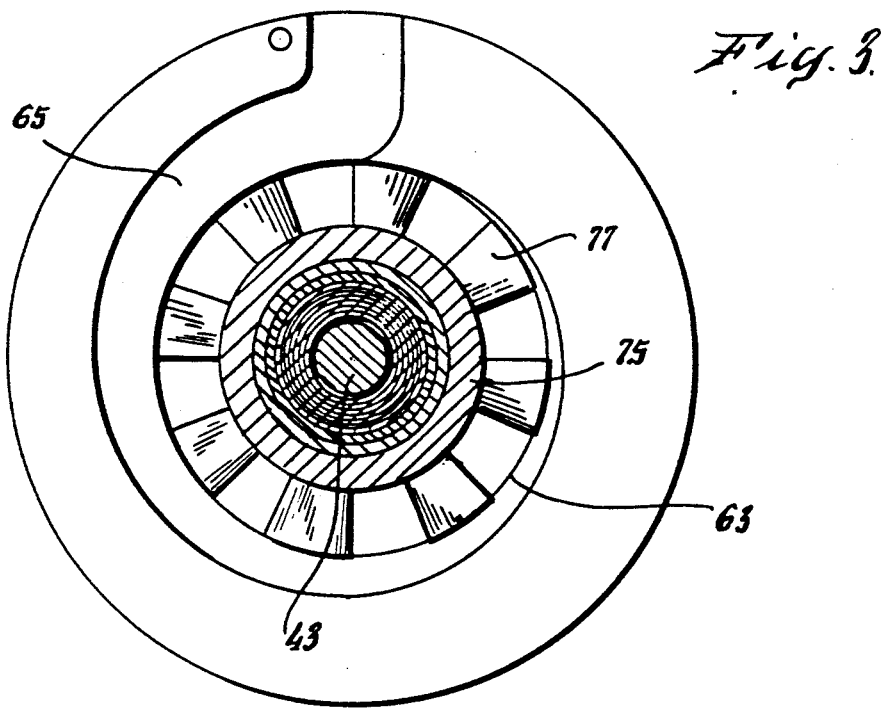
FIG. 3 is a full transverse section, taken as indicated on line 3—3 of FIG. 1, showing the centrifugal compressor 19 and its low-pressure bleed duct, together with the motor rotor and stator.
Figure 4:
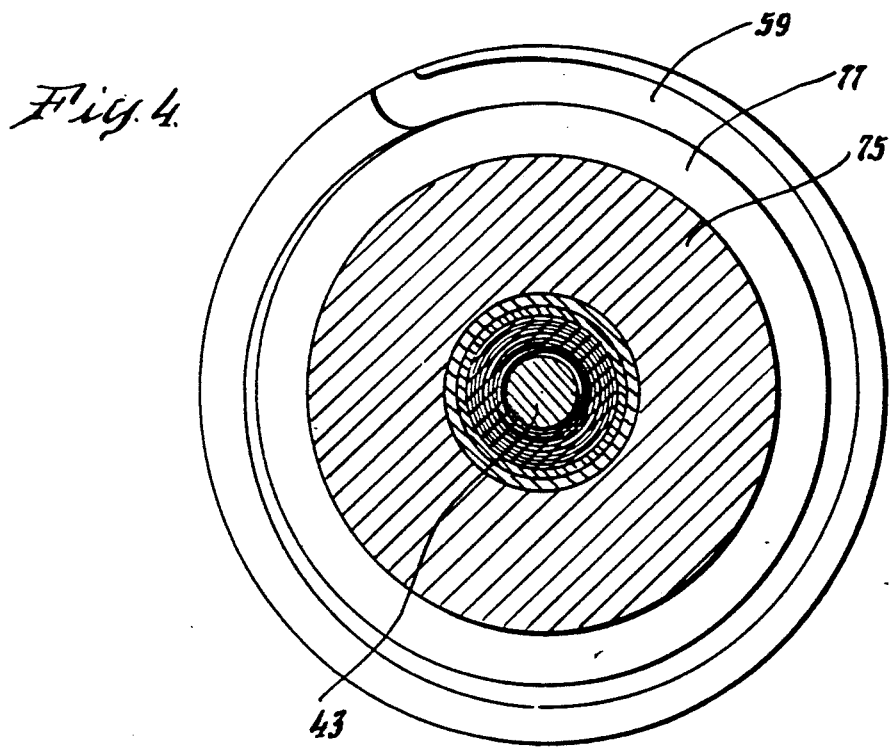
FIG. 4 is a full transverse section, taken as indicated on line 4—4 of FIG. 1, showing the high-pressure bleed and the free-vortex diffuser.
Figure 5:
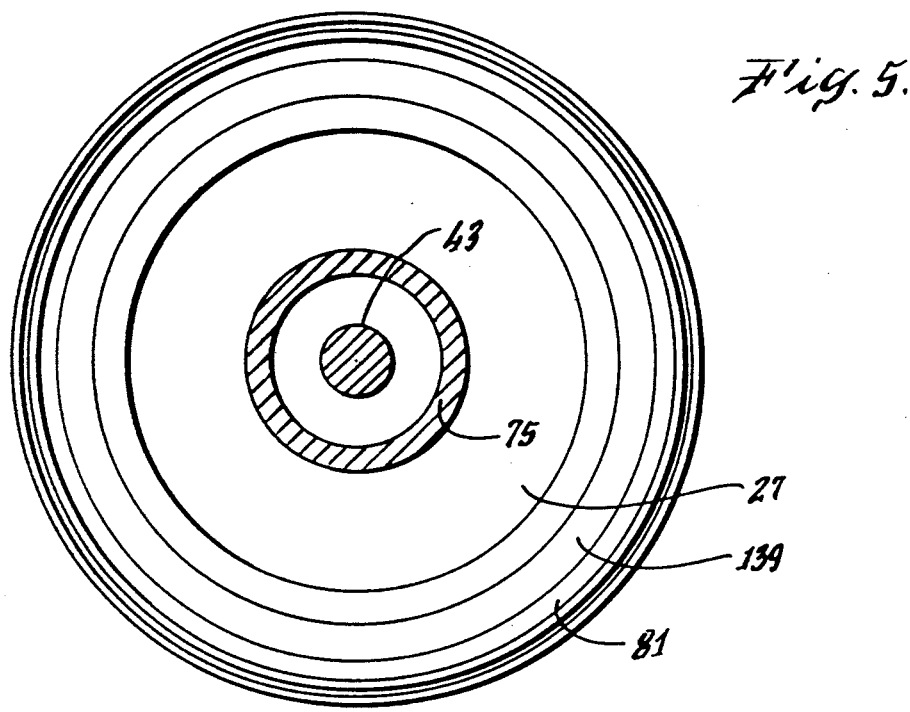
FIG. 5 is a full transverse section, taken as indicated on line 5—5 of FIG. 1, showing the turbine rotor.
Figure 6:
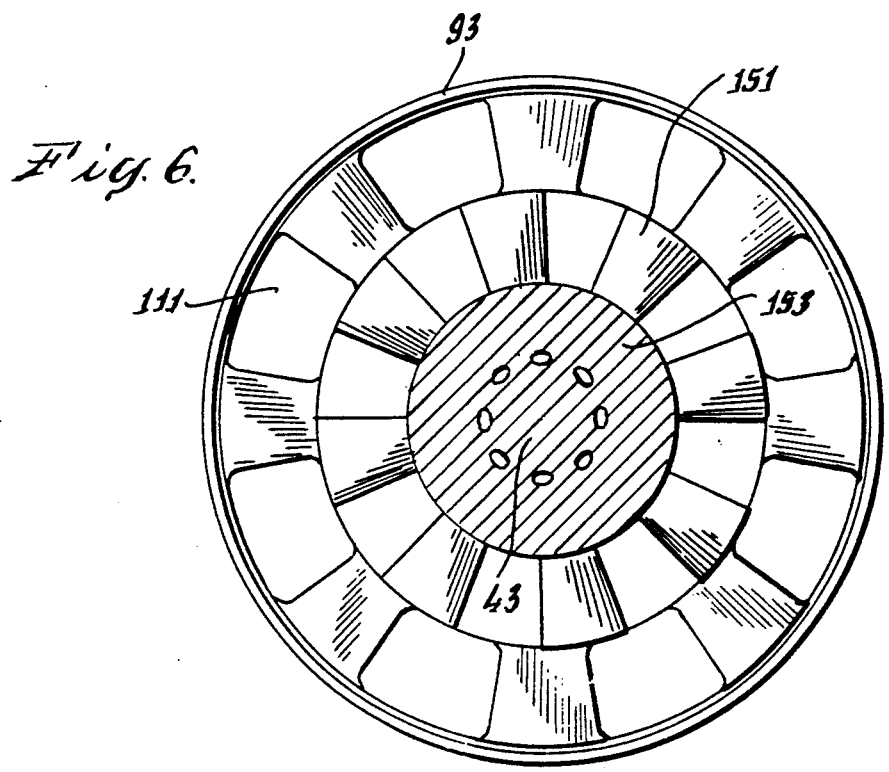
FIG. 6 is a full transverse section, taken as indicated on line 6—6 of FIG. 1, showing recuperator ducting.

The primary elements of my core engine 15 are shown principally in FIGS. 1 and 7. These include, in sequence, an axial flow compressor 17, a centrifugal compressor 19, recuperators 21 (not always used), annular "folded-comma" burners 23, a radial high pressure turbine 27, an axial flow turbine 29, and an exhaust nozzle 31. As stated, the centrifugal compressor and radial turbine have a common face formed of porous material so that transpiration occurs between them, reducing the compressor boundary layer and cooling the turbine.

In addition there may be the usual inlet grill 35, debris blocker 37, and dust deflector 39 (FIG. 7) and also a core shaft 43, and output coupling 45, and the usual bearings and air seals.

Axial Flow Compressor

The single-stage axial flow compressor 17 is a supersonic design with shocks in both the rotor 51 (with hub 53) and the stator 55 (with hub 57). It has blades 41 with sharp leading edges, a ceramic portion 42 (FIG. 9), and thin, controlled-diffusion airfoils.

Conventionally, axial-flow compressors have been designed to maximize mass-flow per unit frontal area, with some sacrifice in pressure rise per stage and/or stage efficiency. Because centrifugal compressors have large frontal area, axial compressor stages that are followed by centrifugal compressors do not need to maximize axial mass flux density, but conventional engines have such axial booster stages scaled directly from other axial-flow engines.

Conventional wisdom has it that higher axial velocity allows greater energy to be added to the airflow for the same tangential velocity of the blades, and hence generates greater pressure rise across the stage. However, that viewpoint ignores the effects of blade angles that allow greater energy addition and pressure rise for smaller axial velocities. Further, smaller axial velocities allow reduced inlet relative velocities and Mach numbers, reducing inlet shock losses for transonic stages. Small axial velocities for high pressure rise do imply higher Diffusion Factors and DeHaller Numbers. However, small axial velocities allow longer blade chords that allow larger area ratios for separation-limited diffusion angles, and hence allow larger diffusion factors to be possible. Low axial velocity also prevents stalling of the first stage during start up.

In a conventional compressor during start up, at low rotational speeds, the pressure rise and hence increase in density across the first stages of the compressor is rather small. Thus the low-density, i.e., high volume, airflow reaches some velocity in the small passages in the latter stages of the compressor that are designed to pass high-pressure, high-density flow. This sonic "choking" of the flow in the aft stages reduces axial velocity in the forward stages, where the blades are set at angles appropriate for high flow. The blades in the forward stages thus stall, suffering loss of performance and mechanical vibrations.

Damage to the blades during start-up in conventional engines is prevented by using high-power starter motors to quickly accelerate the engine through the stall during start up, although the problem remains with many conventional engines. Use of a low axial velocity throughout the engine avoids the choking of flow in the latter stages of the compressor. And, even if the flow was to choke, the reduced angle of the blades with the tangential direction can be less than the stalling angle of the blades, eliminating the problem of start-up stall.

My axial compressor stage 17 is designed to optimize a combination of pressure rise and stage efficiency while sacrificing axial mass flow. This design also minimizes the vulnerability of the blades to stall because of the reduced setting angle of the blades at their leading edges. I use, for example, a setting angle (between the blade camber line at the leading edge and the tangential direction) of about 15°, but the angle can be lower. (The corresponding blade angle with the axial direction is about 75°). Further, the blades can then have longer streamwise chord for the same axial chord, for enhanced strength of the blades and/or reduced thickness/chord ratio for reduced shock losses. The ratio of streamwise to axial chord can range between about 4 to about 1.

One common problem with axial compressors is the rapid growth of stagnant boundary layers on the hub surface of the compressor rotor due to the centrifugal field created by the rotor. This causes stall of the blades in the hub region and reduction in the compressor efficiency. My engine alleviates this effect by having a sharply-curved flow passage 57 in the compressor so that the passage appears concave radially outwardly. This curvature, as shown, will impose a centrifugal flow field due to the flow velocity, inducing a tendency for the air stream to adhere to the hub contour. This helps counteract the radially outward flow field caused by the rotor.

Suppression of the boundary layer growth near the hub surface is also provided by allowing air to leak through the gap 54 between the rotor hub 53 and the stator hub 57. This leakage air reduces the boundary layer thickness near the hub surface and also provides the air for cooling of bearings and motors/generators 67 and 68 on the shafts.

The wall boundary layer near the axial shroud 63 is tapped off into a low-pressure bleed duct 65. This low-pressure bleed air may be used for cooling fuel pumps, avionics, etc. on the engine or user vehicle or for pneumatic flow control on vehicle surfaces.

An additional bleed gap 79, just before compressor blades 77, provides bleed air for cooling the bearings.

My axial compressor design provides for a stage pressure ratio of about 2:1, with a stage efficiency of about 90% (compared to the usual efficiency of about 85%). It achieves this by having a tip velocity of about 450 m/sec (1500 ft/sec) with a rotor speed of about 54,000 rpm. Stage efficiency is maximized through the use of negative preswirl, swept leading edges, flutter-resistant low-aspect-ratio blades, fillets at blade roots, relatively high hub/tip ratios, radial equilibrium aided by duct curvature and by low axial velocity, as noted above.

The shroud 63 of the axial compressor has a porous surface facing the air flow path. The pores will trap dust particles in the air that impact the shroud due to the rotational flow field generated by the axial compressor rotor. The dust will thus be prevented from blocking the transpiration passages in the centrifugal compressor and turbine system.

Further, the stator section following the axial compressor has dust collecting airfoils that have porous surfaces on the pressure side. These porous surfaces will trap dust particles impacting the same due to the camber of the flow path.

Centrifugal Compressor

The centrifugal compressor 19 is a hybrid axial-radial design with transonic inlet velocity. The blades have sharp leading edges at the inlet and backward curvature at the exit for high efficiency and flow stability. Compressor 19 and radial turbine 27 (described below) have a common hub 75 which is concentric with but separate from core shaft 43.

The hub 75 carries impeller blades 77 on surface 26 and the turbine blades on surface 146. Hub 75 is porous, allowing boundary layer air on the hub surface to seep through the hub material into the radial turbine 27. This porous material can be a ceramic like silicon nitride or, preferably, a fiber-reinforced ceramic like silicon carbide whiskers in silicon nitride with a high fiber content and low matrix content. The porosity should be sufficient to suppress compressor boundary layers and, to the extent of the transpiration, to cool the turbine.

This air seepage suppresses growth of the boundary layer on the impeller hub 75, prevents heating of the impeller 77 by the turbine 27 (which would otherwise reduce compression efficiency), and provides for cooling of the turbine to retain turbine strength despite the high temperature of the gases in the turbine flow passages.

Ideally, the porosity of hub 75 will be adequate to provide transpiration that will reduce the boundary layer to approximately zero. Less porosity will provide less transpiration causing the compressor to be less efficient due to the presence of some remaining boundary layer; more porosity than that will result in too much transpiration, wasting air and causing loss of mechanical power.

This integral compressor-turbine unit is modular in that after wear, or if the pores of the hub become clogged with dust despite the dust separators, discussed below, the entire compressor-turbine unit may be simply replaced as a whole.

The centrifugal compressor 19 has a high pressure bleed duct 59 on the centrifugal shroud surface 64 after the impeller. This bleed duct taps off any boundary layer on the shroud surface of the impeller and also can provide air for pneumatic flow control on the user vehicle, or pressurization of the main cabin, and the like.

Centrifugal compressor 19 has a design pressure ratio of about 5:1 and a target stage efficiency of about 80%. The design tip speed is relatively high, about 600 m/sec (2,000 ft/sec) at a rotational speed of about 60,000 rpm.

These high rotational and tip speeds are possible, even with this backward-curved design, because of low radial and tangential stresses. The radial stresses are low because the impeller 77 is made of low-density fiber reinforced ceramic material, such as silicon carbide whiskers in silicon nitride, having a density in the order of about three grams per cubic centimeter, and because of the porous nature of the common compressor-turbine wheel 87 (FIG. 8). This results in low centrifugal stresses.. The tangential stresses are low because the compressor is not shaft driven, as in conventional compressors, but is driven by facial contact of the impeller vanes 77 along their length with hub 75, for direct transfer of forces between the turbine 27 and the compressor 19.

The stator section 81 of the centrifugal compressor has exit guide vanes 81 following the principal flow direction of the air to act as a diffuser and convert the high axial-radial-tangential velocity of the air leaving the impeller into lower axial velocity and higher pressure. The diffuser inner shroud 85 and the vanes 81 also have a porous construction, normally being made of the same material as the hub/interface 75, to reduce diffuser boundary layers, reduce heat transfer from the turbine nozzles, and allow transpiration cooling of the nozzles.

The Recuperator

There are instances, such as with turbo-shaft engines or a high-by-pass-ratio turbofan, where it is advisable to have a recuperator. In a recuperator a significant amount of thermal energy is transferred from the hot exhaust gases leaving the axial flow turbine 29 (described below) to the high pressure air of the compressor 19 before the air is ducted to the burner 23.

The high pressure air from compressor 19 passes through stator 81 and is carried by annular duct 93 to recuperator 21 (FIG. 7) located near the rear of the engine 15. (The recuperator is not shown in FIG. 1, but would be positioned just aft of the core engine). The recuperator itself is a cross-flow shell and tube design and the hot gases flow in a quasi-axial direction from the axial flow turbine 29 to the exhaust nozzle 31. Air from the compressor 19 is ducted radially inwardly through a large number of narrow tubes 95 from the outer annular region 97 to a chamber 99, near to and concentric with the axis of the engine, and then radially outwardly through more narrow tubes 95 to another outer annular region 103. This radial-in and radial-out set of tubes 95, along with the associated ducting, forms one unit of the recuperator.

Figure 10:
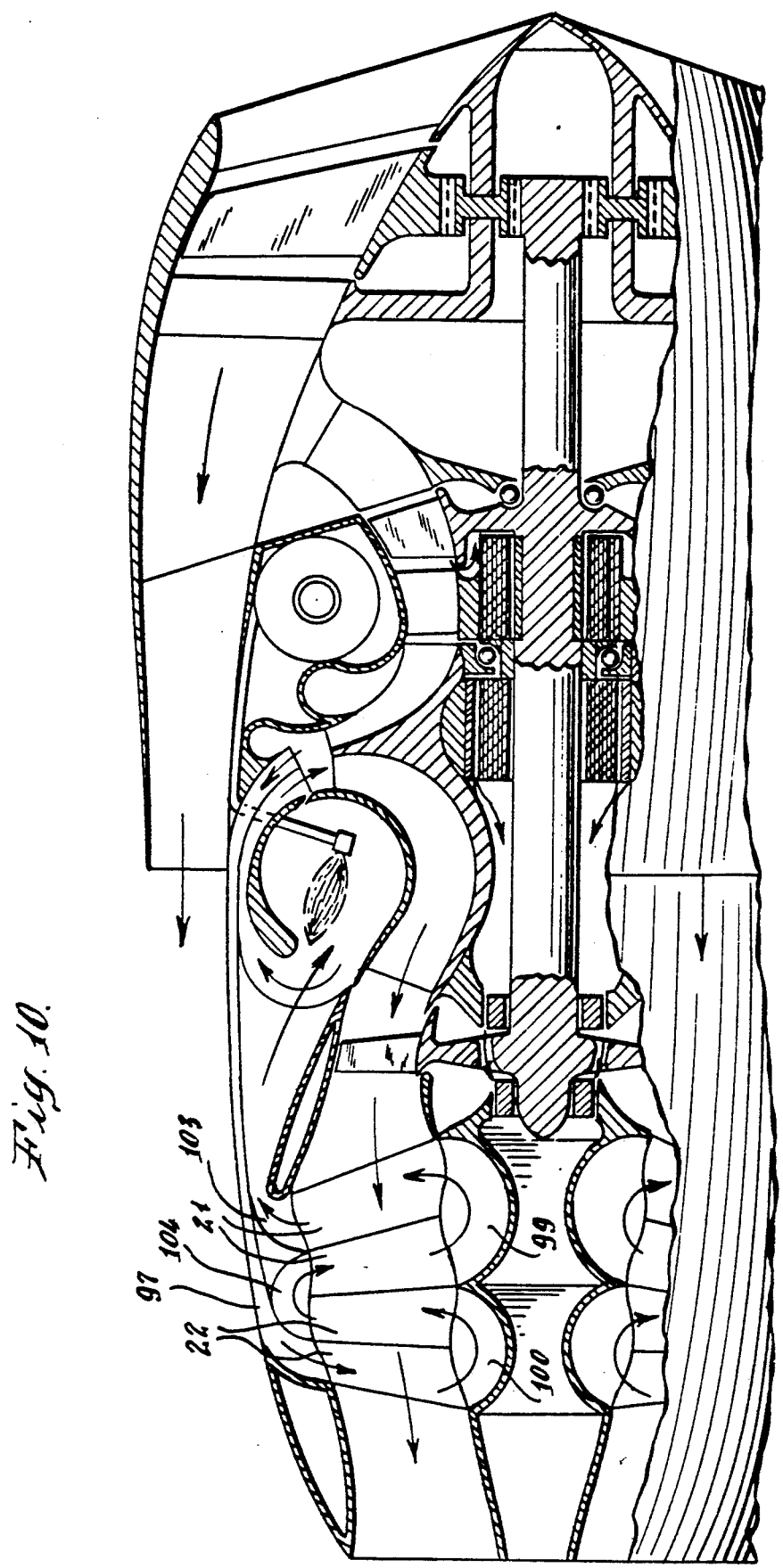
FIG. 10 is a longitudinal section of a medium by-pass ratio geared turbo-fan with a two-stage recuperator.

Many engines, including the core engine, could have one or more such recuperator units. For example, the high-pressure, low-bypass-ratio turbofan of FIG. 7 has only one such unit, while a moderate-pressure, medium-bypass-ratio turbofan as shown in FIG. 10 might contain two; and a turbojet none. This modular usage of one or more recuperator units optimizes the combination of overall engine pressure ratio and recuperator effectiveness for optimum engine efficiency and weight.

FIG. 10 shows a second recuperator stage 22 added after recuperator stage 21. Duct 97 has been modified to feed recuperator stage 21 with an interstage duct 104 added to transfer flow from recuperator stage 22 to recuperator stage 21. Chamber 100 performs the same function for stage 22 as chamber 99 does for stage 21.

The recuperator provides significant gains in fuel economy by making use of thermal energy in the exhaust gases to preheat air before combustion. It also reduces the infra-red signature of the engine by, first, reducing the exhaust gas temperature (for a fourth-power reduction in infra-red emission), second, blocking a direct line of sight from the hot turbines to the exhaust nozzle, and, third, by having the hot turbine section surrounded by the two annular ducts 93 and 103 running to and from the recuperator (FIG. 7). These ducts also recover some of the thermal energy that would otherwise be lost through the casing 30 of turbine 29. By reducing heat that needs to be added in the burner, the recuperator also reduces the size needed for the burner.

The "Folded-Comma" Burner

I refer to my burners as "folded-comma" burners because these burners 23 have the appearance of a folded comma as viewed in FIGS. 1 and 7.

The folded comma burner unit 23, is located circumferentially of the nook of the radial turbine 27. A typical engine 15 may have six burner units spaced annularly about turbine 27. Each burner 23 includes two distinct types of burning regions: one, a pilot region formed by a wide-angled, high-turbulence diffuser 113 (shaped as an open-ended diverging two-dimensional duct) in the feeder duct 111 and, two, a main region having a pair of bulbs 115 (shaped like the main body of a comma). The two main regions in each burner receive air through the space between the inside surface of feeder duct 111 and the outside surface of diffuser 113. Each bulb-shaped main region of the burner receives air from two ducts 111, just as each duct 111 feeds two bulbs 115. The pilot region includes fuel spray nozzle 121; and the main regions, fuel spray nozzles 123. The nozzles are fed fuel through fuel lines 127 leading from fuel pumps 125 (located radially outwardly of axial flow compressor 17).

Nozzles 121 and 123 are preferably ceramic, possibly high density silicon nitride This allows the fuel nozzles, which have low strength requirements and are internally cooled by flow of fuel, to operate submerged within the burning gases. The nozzles inject a mixture of fuel and air, and are purged by air after fuel shut-off to prevent coking of fuel in the nozzles. Alternatively, ultrasonic pulses in the fuel line may be used to create atomizing pressure pulses as well as keep the fuel injectors free from coke and other fuel residues.

The burners should best be made of woven carbon-carbon composites, and possibly have several layers of ceramic coating. Carbon-carbon exhibits high strength to temperatures higher than adiabatic flame temperatures (about 2260° K. / 3600° F.) for typical fuels, provided it can be protected from oxidation. One possible material would be woven carbon-carbon with SiC conversion coating and a coating of ZrO, possibly mixed with HfC and ZrB. Other coating materials include ZrC, Ir, and $SiO_2$.

In operation of the burners, hot, compressed air from the recuperator 21 is ducted forward through feeder duct 111 to the burners 23, and the two regions 113 and 115 are sprayed with fuel through nozzles 121 and 123. The hot products of combustion then pass to the rotor 141 of radial flow turbine 27 by way ducts 131 (the folded tails of the "commas") and nozzles 139. Turbine 27 includes rotor blades 41 carried in throat 143 by hub 75. The mean radius of throat 143 is larger than the mean flow radius halfway through the turbine.

As can be seen, the basic design philosophy behind my burner design is two-stage combustion with a pilot region and a main region. The pilot region burns part of the fuel under fuel-rich conditions, with the resulting oxygen deficiency minimizing the production of oxides of nitrogen. Flame stability is provided by the turbulence in the rapidly divergent duct causing recirculation of burning gases. The main region would then have the fuel injected into the hot burning gases flowing from the pilot region and so would achieve rapid combustion with very little residence time in the burner. Any soot formed in the pilot region would be oxidized in the high temperature main region; at the same time, residence time in the main region would be small enough to minimize formation of $NO_x$.

The flow path for gases is designed to utilize heat transfer from hot gases to compressed air and enhance efficiency. Air leaving centrifugal compressor 19 in duct 93 is preheated by the air entering radial turbine 27 by duct 131, since ducts 93 and 131 have a common wall. The air in duct 93 is further preheated because the duct then has a common wall with air in duct 111 leading from the recuperator. It should be noted that the ducts with the coolest air are on the outside of the engine, reducing heat loss. This provides constructive shrouding and reduces the need for cooling air for the cowl, resulting in a self-cooling cowl.

Also, as can be seen, my design utilizes annular space radially outside the turbines, which space has not previously been used. The folded-comma shape of the burner reduces the cross-section, so the engine is smaller. Having the burner surrounded on all sides by fluids which use the heat means that my engine requires less heat to develop the necessary energy, and so it is more efficient.

The Radial High-Pressure Turbine

As stated above, the high-pressure centrifugal compressor 19 is mounted back-to-back and on the same hub 75 as the inward flow radial turbine 27. As can be seen, its blades 141 are mounted on surface 146 of hub 75. Thus, rotation of turbine 27 serves to rotate compressor 19, and they rotate at a common speed.

Turbine 27 is fed by a ring of nozzles 139 which receive hot combustion gases from duct 131; and the nozzles convert the annular axial flow of those high pressure gases into a substantially tangential and inwardly-radial high-velocity flow that impinges on the inward flow radial turbine rotor 141. The nozzles share the outer shroud 85 in common with the diffuser inner shroud 85, the shroud being made of a porous material to allow transpiration of boundary layers from the diffuser to cool the nozzles.

The gases leave the nozzles at a supersonic absolute velocity of about Mach 1.3, but, because of the high rotational speed of the rotor 141 (about 60,000 rpm), have a subsonic velocity of about Mach 0.7 relative to the rotor. The gases expand further in turbine rotor 141, through the sonic throat region 143, into larger discharge area 147, and leave the rotor, at supersonic speed, in a direction reversed almost 180° from the entrance direction. Turbine rotor 141 is therefore driven by the impulse caused by the change of direction of the relative velocity as well as the reaction caused by the high exit relative velocity of the gases effluxing from the turbine.

Turbine 27 is designed to produce only sufficient power to drive the centrifugal compressor 19 plus enough power to drive a high speed electric generator XXX integral with the rotor 141.

The compressor-turbine hub 75 is made of ceramic-fiber reinforced ceramic-matrix composite (e.g., SiC whiskers in $Si_3N_4$ matrix) integral, as stated above. This compressor-turbine hub has a high fiber content and low matrix content which gives it high tensile strength to withstand rotational stresses and relatively high porosity to allow seepage of airflow from the compressor to the turbine. This seepage flow from surface 76 to surface 146, which is at a rate of about 2% of engine air flow, suppresses boundary layers in the compressor, reduces heating of the compressor by the turbine, and provides for transpiration cooling of the turbine so that it retains adequate strength at its high operating temperatures.

The Axial-Flow Turbine

The high-velocity discharge from the high-reaction radial turbine 27, leaving exit region XXX, drives single-stage axial-flow turbine 29. The gases leaving axial-flow turbine 29 are of low tangential velocity and have a moderate axial velocity of about 300 m./sec. (Mach 0.5)

The axial-flow turbine 29 has blades 151 and drives the power output shaft 43 of the engine through hub 153. This output shaft is concentric with and central to hub 75 the hollow-shaft centrifugal compressor 19 and the radial turbine 27. Hub 75 and shaft 44, however, rotate independently of one another. Power output from the axial-flow turbine can be used at either the front or the rear of the engine, with or without gear boxes.

Hot gases from the axial-flow turbine 29 pass through the recuperator 21 (FIG. 7) where, as described above, heat is transferred from the efflux gases to the compressed air flowing from the compressor 19 to the burners 23. The hot efflux gases finally exit from the engine 10 through a converging nozzle 31 (FIG. 7) at the rear of the engine. Alternatively, the nozzle may be converging-diverging for high-pressure turbojet-type engines.

Bleed Ducts: Active Through-Flow Control

Engine 15 has bleed ducts 65 and 59 for low pressure air from the axial flow compressor 17 and high-pressure air from the centrifugal compressor 19, respectively. Bleed duct 54 between the rotor hub 53 and stator hub 57 allows boundary layer air to cool bearings and motors/generators 67 and 68. For a typical engine application, the high-pressure bleed air may be used for cabin heating and pressurization, and the low pressure air may be used for blowing on airfoils (for augmented lift) on the user vehicle. In addition, the bleed system provides active through-flow control for the compressors to enhance their performance, efficiency, and stability, as noted below.

During starting or operating at low speeds, the first stages on typical engines generate reduced compression and reduced gain in density, which causes the latter stages to choke out, which in turn causes the first stages to stall. My engine prevents stalling the axial compressor at low speeds by having the low pressure bleed valve open to maintain high volume flow rate through the compressor. Similarly, if the centrifugal compressor has a tendency to stall because of choking of the exit guide vanes, the high-pressure bleed valve may be partially opened to reduce volume flow through the exit guide valves.

Inlet Area

FIG. 7 shows my core engine being used in a low-bypass-ratio turbofan. Inlet grill 35, the "bird blocker" grill, has a large mesh, about 5 cm (2 inches) grid size. Debris exits through slots 36. Grill 35 is followed by "insect blocker" grill 37 of smaller mesh, about 1 cm (0.4 inch). The air then passes through a low bypass ratio fan 38, driven by shaft 43, a portion of it entering my core engine 15 and the remainder leaving by fan-jet nozzle 40.

The inlet guide vanes for the first compressor have porous surfaces on the pressure side of the vanes. These porous surfaces will trap dust particles that impact the pressure surfaces of the guide vanes due to camber of the air flow path created by the vanes. The inlet guide vanes will thus form an effective dust filter with a very low pressure drop, and will be replaceable as a module. The porous surface here, as with that of shroud 63, may, for example, be made of a felt-type matted surface or open-cell plastic foam.

I claim:

1. A core gas turbine engine having enhanced efficiency relative to its weight said engine including
   an inlet compressor, an outlet turbine, gas ducting means running between said inlet compressor and said outlet turbine,
   an outwardly centrifugal compressor, burners, and an inwardly radial turbine positioned in said gas ducting means between said inlet compressor and said outlet turbine,
   said outwardly centrifugal compressor and said inwardly radial turbine being mounted on a common hub such that their faces form an integral interface, whereby said inwardly radial turbine will drive said outwardly centrifugal compressor at a common speed of rotation, said hub being rotatable independently of said inlet compressor and said outlet turbine, and
   said hub being made of porous material whereby air in the boundary layer of said centrifugal compressor can seep from said centrifugal compressor to said inwardly radial turbine and cool same.

2. A core gas turbine engine as set forth in claim 1 including an incoming air flow path preceding said inlet compressor, inlet guide vanes in said incoming air flow path and forward of said inlet compressor, said guide vane having porous surfaces on the pressure side thereof, and said porous surfaces having sufficient porosity to trap incoming dust particles.
   whereby said porous surfaces will trap incoming dust particles due to camber of said air flow path.

3. A core gas turbine engine as set forth in claim 1 including a shroud surrounding said axial compressor, the surface of said shroud facing inwardly of said gas ducting means having a porous surface of sufficiently porosity to trap dust particles impinging on its surface.
   whereby dust particles impinging on said surface will be trapped.

4. A core gas turbine engine as set forth in claim 1 including stator vanes in said air duct between said inlet compressor and said centrifugal compressor, and said vanes having porous surfaces of sufficient porosity to trap dust particles impinging on said surfaces,
   whereby dust particles impinging on said surfaces will be trapped.

5. A core gas turbine engine as set forth in claim 1 including a motor-generator unit positioned radially inwardly of said common hub.

* * * * *